(12) United States Patent
Chang

(10) Patent No.: US 7,806,134 B1
(45) Date of Patent: Oct. 5, 2010

(54) MIXED WATER CONTROL VALVE HAVING A WATER PRESSURE BALANCE FUNCTION TO STABILIZE A WATER TEMPERATURE

(75) Inventor: Chia-Po Chang, Lugang Township, Changhua County (TW)

(73) Assignee: Hain Yo Enterprises Co., Ltd., Ho-Mei Town (TW)

( * ) Notice: Subject to any disclaimer, the term of this patent is extended or adjusted under 35 U.S.C. 154(b) by 496 days.

(21) Appl. No.: 11/950,503

(22) Filed: Dec. 5, 2007

(51) Int. Cl.
*G05D 11/00* (2006.01)

(52) U.S. Cl. .................... 137/98; 137/100; 137/625.41; 137/625.3

(58) Field of Classification Search .............. 236/12.11, 236/12.2, 12.23; 137/98, 100, 625.41, 625.3
See application file for complete search history.

(56) References Cited

U.S. PATENT DOCUMENTS

| | | | | |
|---|---|---|---|---|
| 2,934,080 | A * | 4/1960 | Rice | 137/98 |
| 3,625,255 | A * | 12/1971 | Genin | 137/637.3 |
| 4,397,330 | A * | 8/1983 | Hayman | 137/270 |
| 6,029,687 | A * | 2/2000 | Chang | 137/98 |
| 6,182,682 | B1 * | 2/2001 | Chen | 137/315.04 |
| 6,267,134 | B1 * | 7/2001 | Chen | 137/98 |
| 6,302,135 | B1 * | 10/2001 | Chung | 137/100 |
| 6,412,513 | B1 * | 7/2002 | Yang | 137/100 |
| 6,470,906 | B1 * | 10/2002 | Shieh | 137/100 |
| 6,517,006 | B1 * | 2/2003 | Knapp | 236/12.2 |
| 6,575,377 | B1 * | 6/2003 | Graves | 236/12.2 |
| 6,676,025 | B2 * | 1/2004 | Ginter et al. | 236/12.2 |
| 6,732,754 | B2 * | 5/2004 | Ottelli | 137/100 |
| 6,845,917 | B1 * | 1/2005 | Chen | 236/12.1 |
| 6,880,575 | B2 * | 4/2005 | Mountford et al. | 137/625.41 |
| 6,907,903 | B1 * | 6/2005 | Chang | 137/636.3 |
| 2001/0020645 | A1 * | 9/2001 | Mountford et al. | 236/12.11 |
| 2003/0173410 | A1 * | 9/2003 | Ginter et al. | 236/12.2 |
| 2007/0119501 | A1 * | 5/2007 | Pinette | 137/98 |
| 2008/0053528 | A1 * | 3/2008 | Breda | 137/98 |

* cited by examiner

*Primary Examiner*—George Nguyen
(74) *Attorney, Agent, or Firm*—Alan Kamrath; Kamrath & Associates PA

(57) ABSTRACT

A control valve for a faucet includes a valve housing, a hollow valve seat, at least one water outlet channel, a fixed plate, a rotation plate, a control unit, two mounting seats, a fixed sleeve, and a movable sleeve. Thus, the movable sleeve is movable in the fixed sleeve to control the water flow rate of the mixed cold and hot water to the optimum value to regulate and stabilize the water pressure automatically so as to provide a pressure balance effect so that the mixed water flowing from the water outlet channel is kept at a constant temperature, thereby providing a comfortable sensation to a user.

20 Claims, 9 Drawing Sheets

US 7,806,134 B1

MIXED WATER CONTROL VALVE HAVING A WATER PRESSURE BALANCE FUNCTION TO STABILIZE A WATER TEMPERATURE

BACKGROUND OF THE INVENTION

1. Field of the Invention

The present invention relates to a control valve and, more particularly, to a mixed water control valve for a faucet to control the temperature of a mixture of cold and hot water of the faucet.

2. Description of the Related Art

A conventional faucet comprises a control valve to mix the cold water from a cold water source and the hot water from a hot water source and to inject the mixed water outwardly for use with a user. Thus, the mixed water has a proper temperature so that the user can use the water comfortably. However, when the water flow from the cold water source or the hot water source is reduced or stops accidentally due to an irregular condition, the water pressure is not balanced, so that the water temperature is increased or decreasing to an excessive extent instantaneously to make the water too hot or too cold, thereby easily causing an uncomfortable sensation to the user due to the too cold water or evenly causing danger to the user due to the too hot water.

BRIEF SUMMARY OF THE INVENTION

The primary objective of the present invention is to provide a mixed water control valve having a water pressure balance function to stabilize a water temperature of a water faucet.

Another objective of the present invention is to provide a control valve for a faucet, wherein the movable sleeve is movable in the fixed sleeve to control the water flow rate of the mixed cold and hot water to the optimum value to regulate and stabilize the water pressure automatically so as to provide a pressure balance effect so that the mixed water flowing from the water outlet channel is kept at a constant temperature, thereby providing a comfortable sensation to a user.

A further objective of the present invention is to provide a control valve for a faucet, wherein the two mounting seats, the fixed sleeve and the movable sleeve are fully hidden in the valve housing so that the water faucet directly has a water pressure balance function without having to provide a pressure stabilizer additionally to stabilize the water pressure, thereby greatly decreasing the cost.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
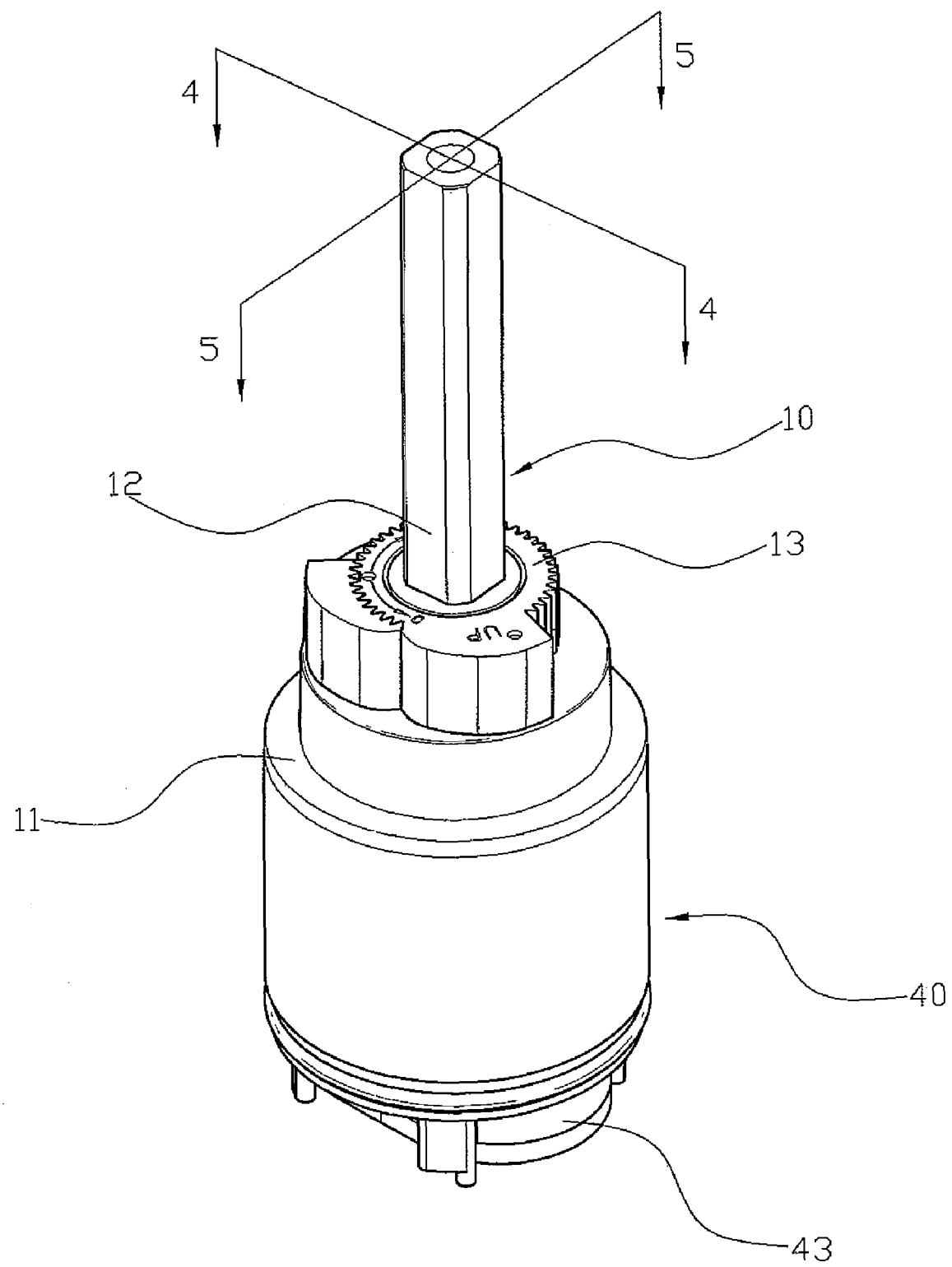
FIG. 1 is a perspective view of a control valve for a faucet in accordance with the preferred embodiment of the present invention.
Figure 2:
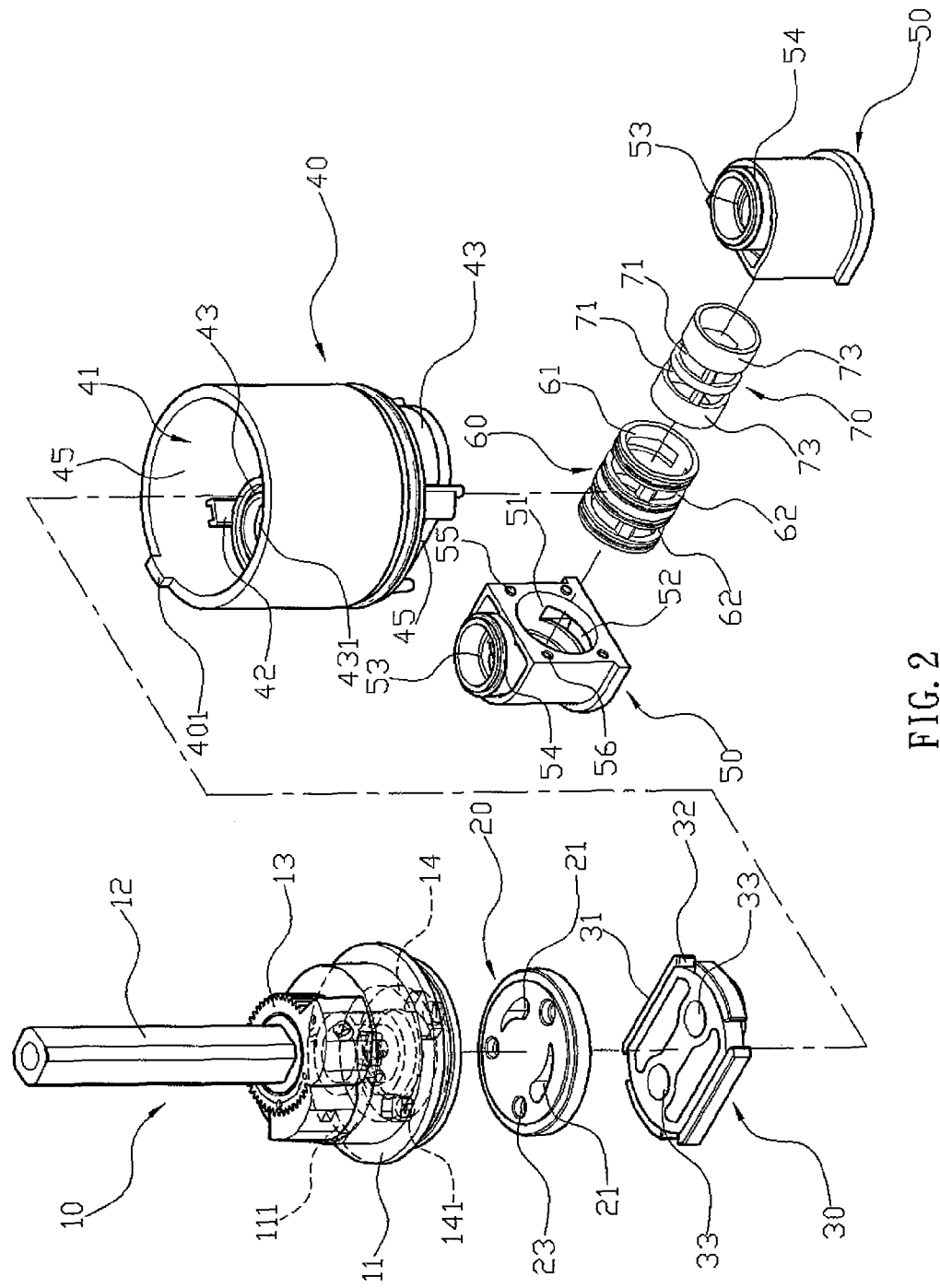
FIG. 2 is an exploded perspective view of the control valve as shown in FIG. 1.
Figure 3:
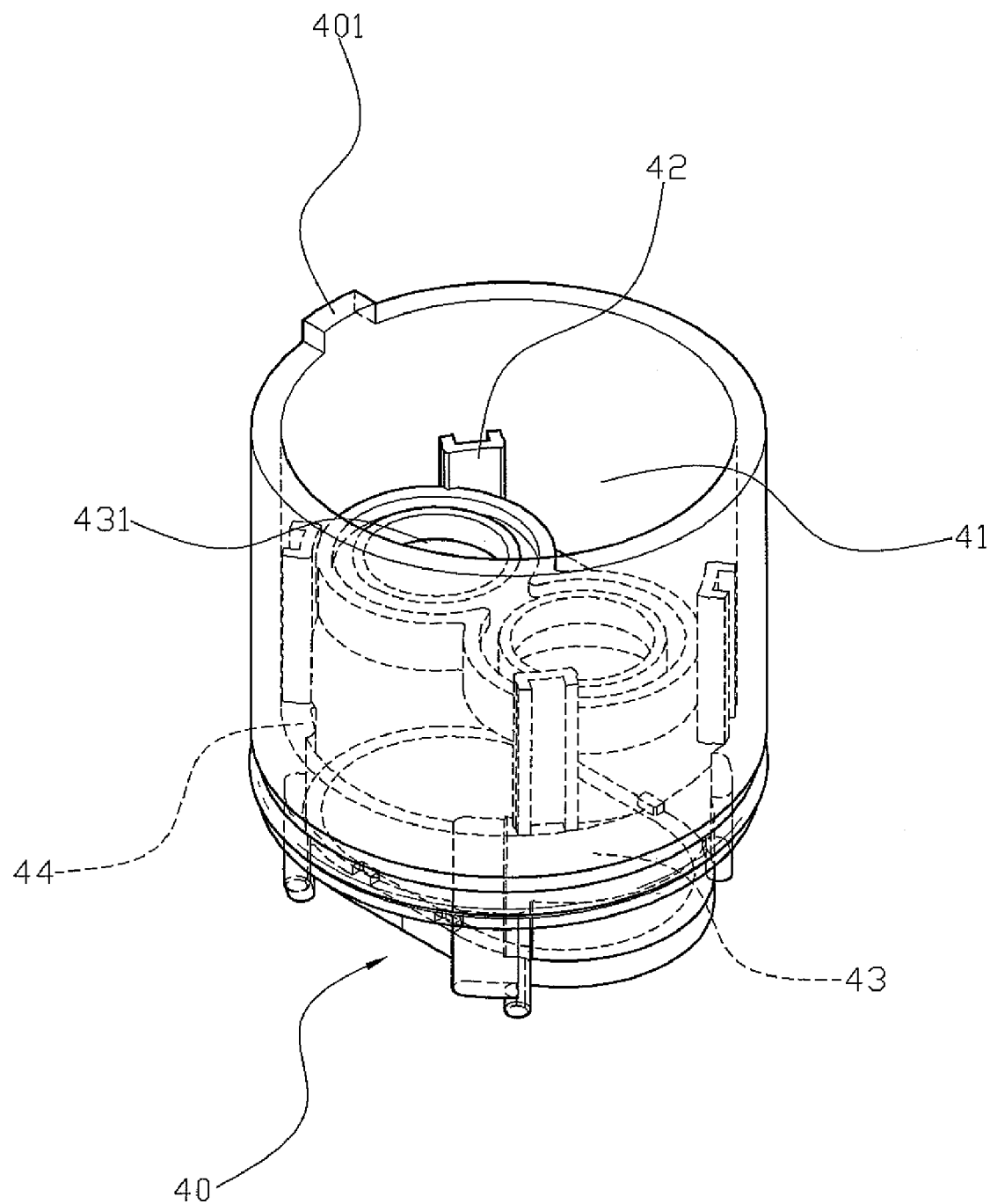
FIG. 3 is a perspective view of a valve housing of the control valve as shown in FIG. 1.
Figure 4:
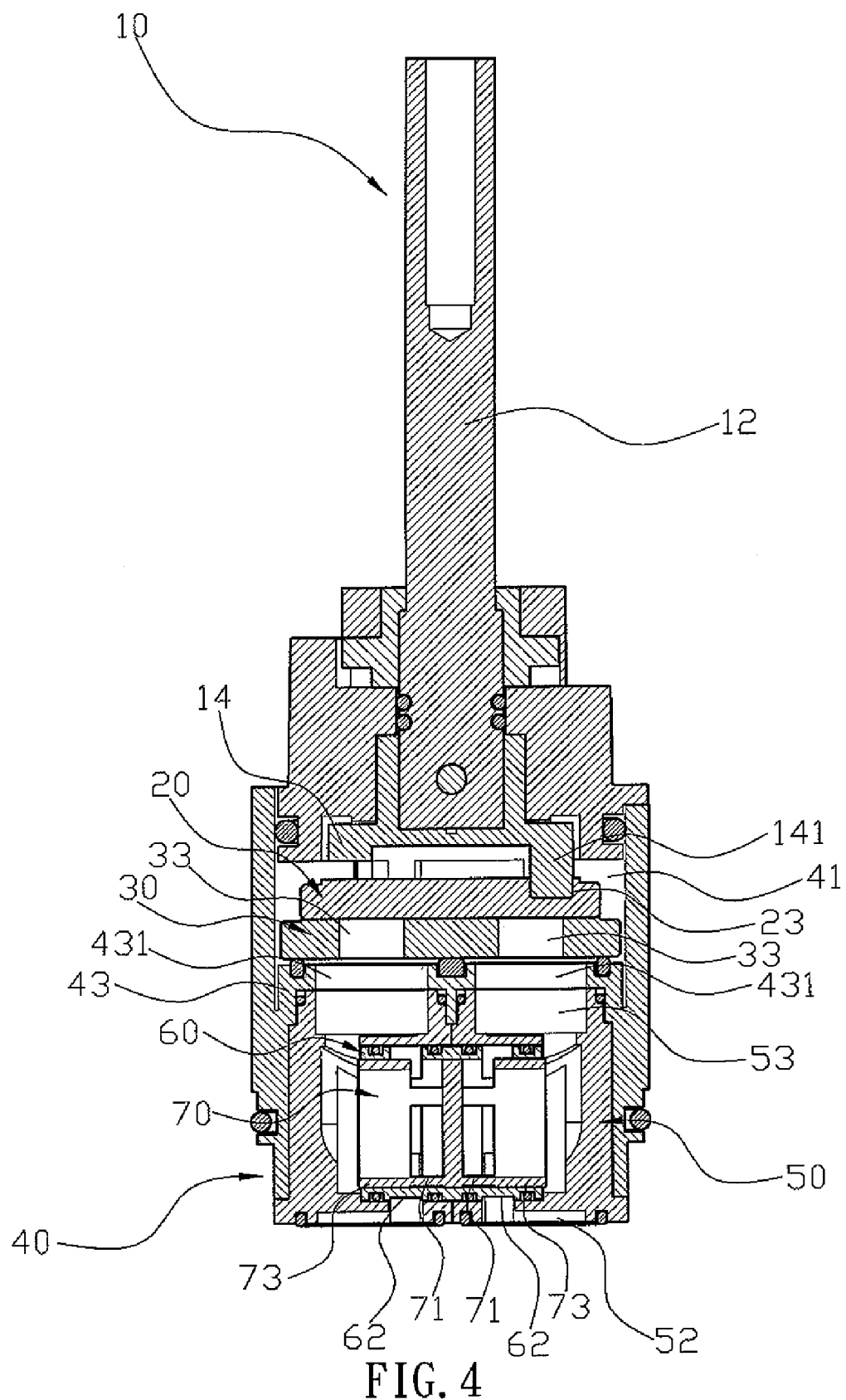
FIG. 4 is a cross-sectional view of the control valve taken along line 4-4 as shown in FIG. 1.
Figure 5:
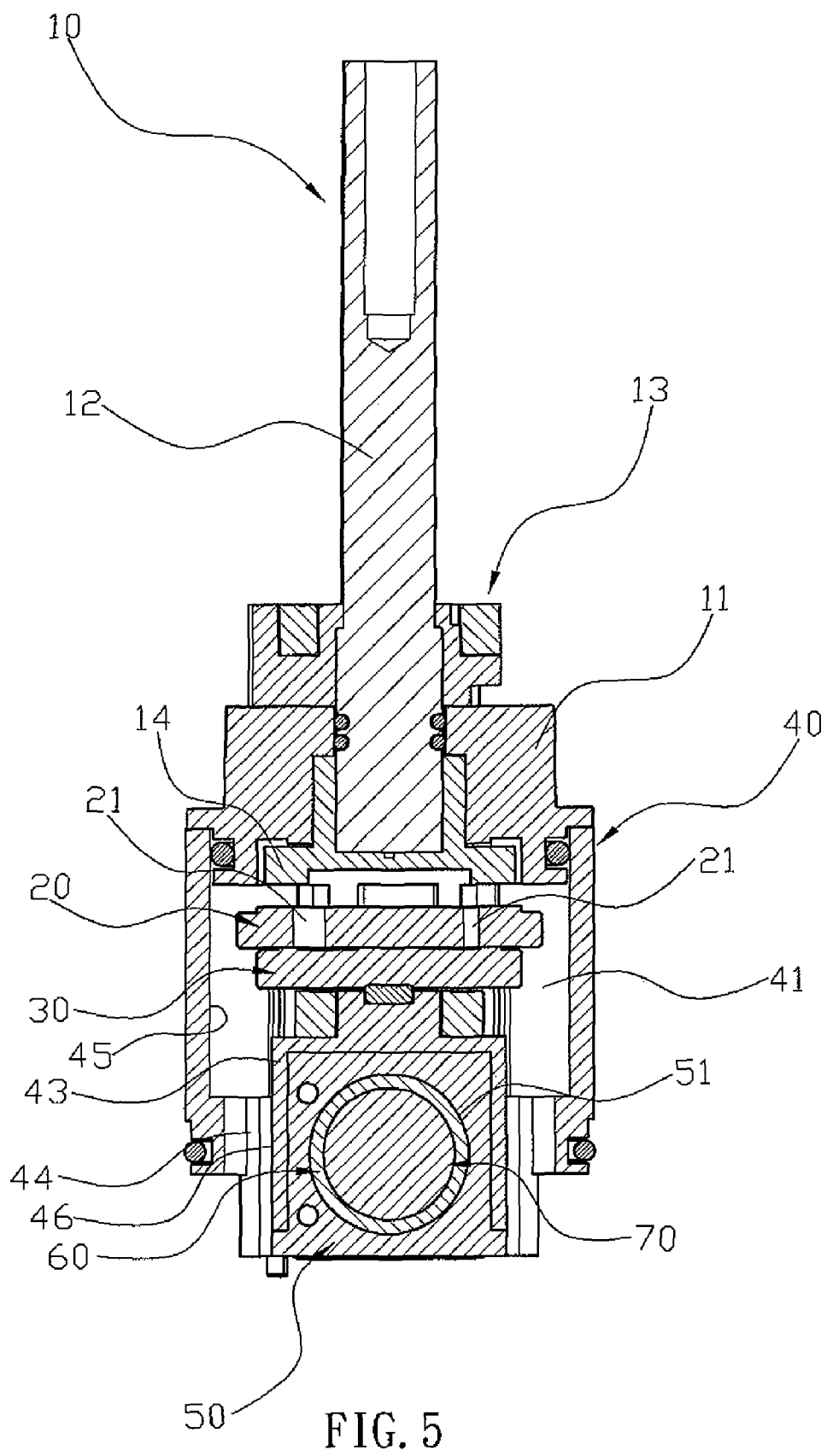
FIG. 5 is a cross-sectional view of the control valve taken along line 5-5 as shown in FIG. 1.
Figure 6:
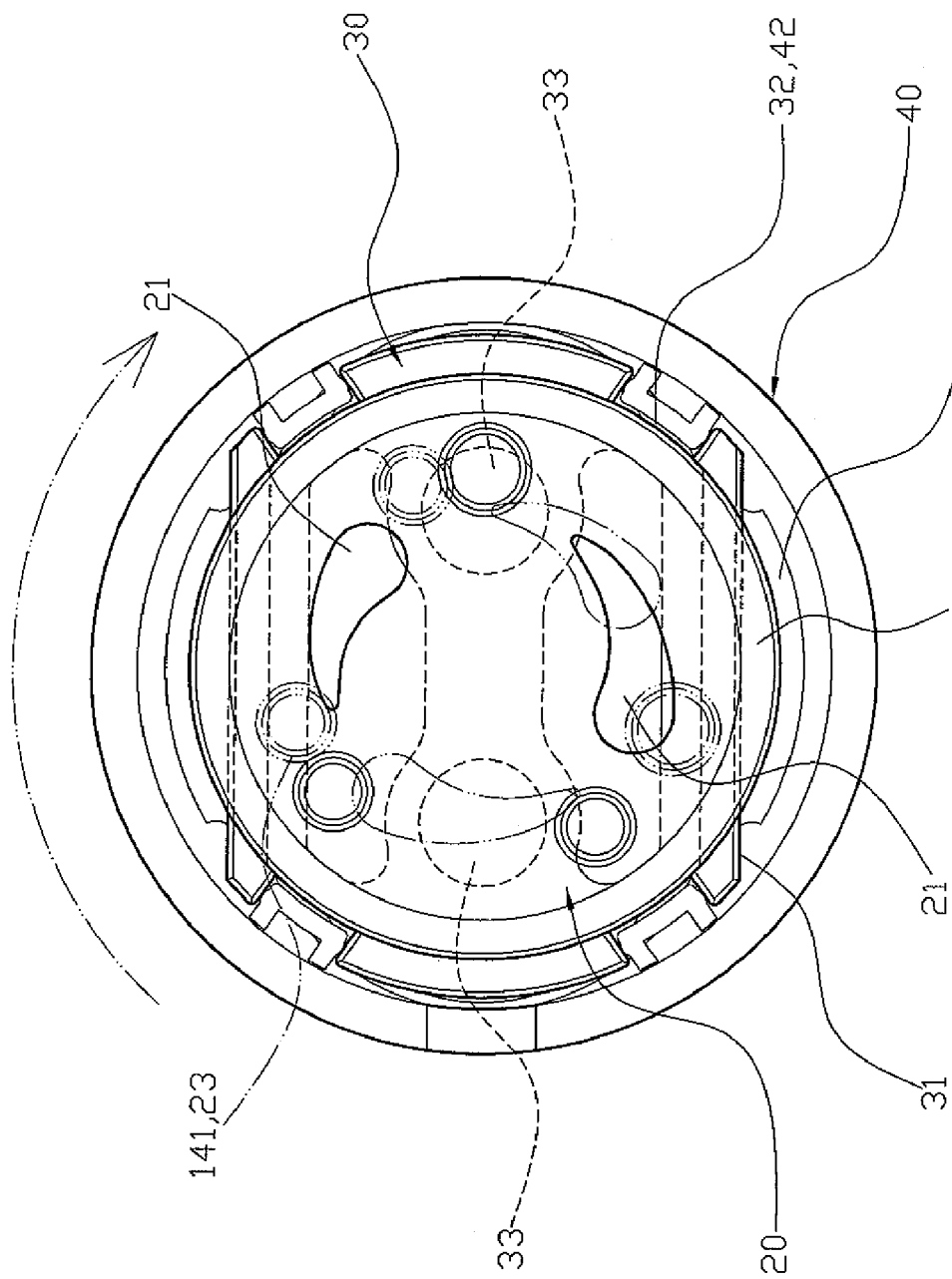
FIG. 6 is a schematic top broken operational view of the control valve as shown in FIG. 1.
Figure 7:
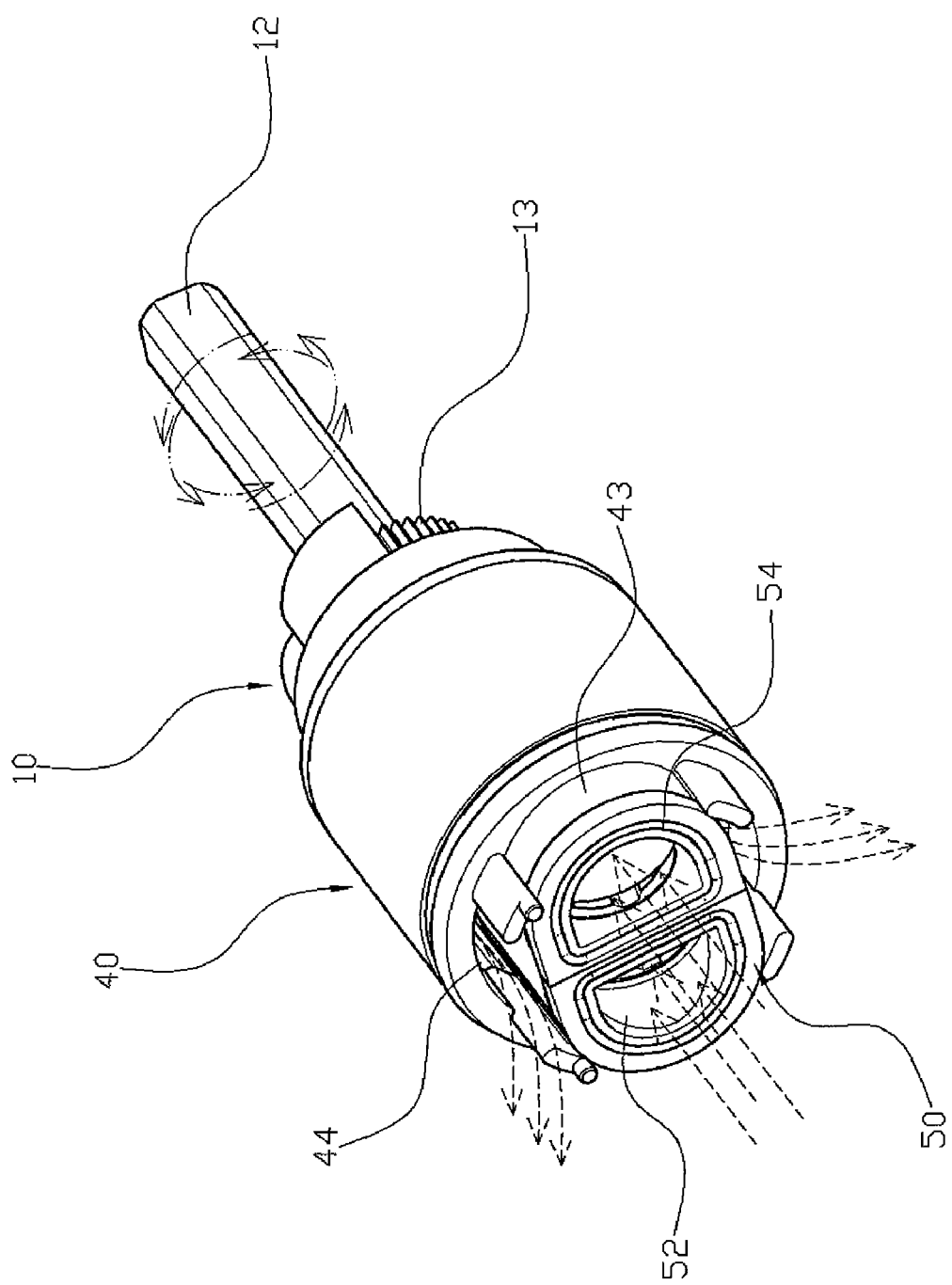
FIG. 7 is a perspective operational view of the control valve as shown in FIG. 1.

Referring to the drawings and initially to FIGS. 1-7, a control valve for a faucet in accordance with the preferred embodiment of the present invention comprises a valve housing 40 having an inner wall 45 provided with a receiving chamber 41, a hollow valve seat 43 mounted in the valve housing 40 and having a top provided with two water conduits 431 each connected to the receiving chamber 41 of the valve housing 40, at least one water outlet channel 44 formed between the inner wall 45 of the valve housing 40 and an outer wall 46 of the valve seat 43 and connected to the receiving chamber 41 of the valve housing 40, a fixed plate 30 (made of ceramic material) secured in the valve housing 40 and provided with two through holes 33 connected to the two water conduits 431 of the valve seat 43 respectively, a rotation plate 20 (made of ceramic material) rotatably mounted in the valve housing 40 and provided with two regulating slots 21 that are movable to align with the through holes 33 of the fixed plate 30 to connect the through holes 33 of the fixed plate 30 to the receiving chamber 41 of the valve housing 40 respectively, a control unit 10 rotatably mounted on the valve housing 40 and secured to the rotation plate 20 to drive and rotate the rotation plate 20, two mounting seats 50 mounted in the valve seat 43 and each having a lower end provided with a water inlet hole 52 connected to one of a cold water source (not shown) and a hot water source (not shown) respectively and an upper end provided with a water outlet hole 53 connected to a respective one of the two water conduits 431 of the valve seat 43, a fixed sleeve 60 secured in the two mounting seats 50 and provided with two connecting grooves 62 each connected between the water inlet hole 52 and the water outlet hole 53 of a respective one of the two mounting seats 50, and a movable sleeve 70 movably mounted in the fixed sleeve 60 and provided with two connecting slots 71 each movable to align with a respective one of the two connecting grooves 62 and two sealing flanges 73 each movable to align with a respective one of the two connecting grooves 62 to partially block or entirely interrupt a connection between the water inlet hole 52 and the water outlet hole 53 of a respective one of the two mounting seats 50.

The valve housing 40 has a top provided with a protrusion 401. The inner wall 45 of the valve housing 40 is provided with a plurality of fixing rails 42. The valve seat 43 has an oblong shape and partially protrudes outwardly from the receiving chamber 41 of the valve housing 40.

The rotation plate 20 abuts a top of the fixed plate 30 and has a surface provided with a plurality of locking holes 23. Each of the two regulating slots 21 of the rotation plate 20 has a horn shape and has a size increased gradually from one end to the other end of each of the two regulating slots 21. The two regulating slots 21 of the rotation plate 20 are directed two different directions.

The control unit 10 includes a valve cover 11 mounted on the valve housing 40 to cover the rotation plate 20, a driven plate 14 rotatably mounted on the valve cover 11 and secured to the rotation plate 20 to drive and rotate the rotation plate 20, a control shank 12 rotatably mounted on the valve cover 11 and having a lower end extending through the valve cover 11 and secured to the driven plate 14 to rotate the driven plate 14, and a micro-adjustment device 13 mounted on the valve cover 11 and co-operating with the control shank 12. The driven plate 14 of the control unit 10 is provided with a plurality of locking legs 141 inserted into the locking holes 23 of the rotation plate 20 so that the rotation plate 20 is rotated by the driven plate 14. The valve cover 11 of the control unit 10 has a periphery provided with an opening 111 secured on the protrusion 401 of the valve housing 40 to secure the valve cover 11 on the valve housing 40.

The fixed plate 30 abuts the top of the valve seat 43 to isolate the two water conduits 431 of the valve seat 43 from the receiving chamber 41 of the valve housing 40. The fixed plate 30 has a peripheral wall provided with a plurality of fixing grooves 32 mounted on the fixing rails 42 of the valve housing 40 to secure the fixed plate 30 in the valve housing 40. The fixed plate 30 has two opposite flattened sides 31 aligning with the water outlet channel 44 between the valve housing 40 and the valve seat 43.

The two mounting seats 50 are juxtaposed to each other. Each of the two mounting seats 50 has a side provided with a mounting chamber 51 connected between the water inlet hole 52 and the water outlet hole 53. The mounting chambers 51 of the two mounting seats 50 are connected to each other. Each of the two mounting seats 50 has a periphery provided with a plurality of locking tenons 55 and a plurality of locking bores 56 so that the two mounting seats 50 are combined together by the locking tenons 55 and the locking bores 56. Each of the water inlet hole 52 and the water outlet hole 53 of each of the two mounting seats 50 has an outer wall provided with an O-ring 54 to provide a sealing effect.

The fixed sleeve 60 is secured in the mounting chambers 51 of the two mounting seats 50. The fixed sleeve 60 has an inside provided with a receiving hole 61 connected to the two connecting grooves 62 to receive the movable sleeve 70. Each of the two connecting grooves 62 has an annular shape and is formed in a peripheral wall of the fixed sleeve 60.

Each of the two connecting slots 71 has an annular shape and is formed in a peripheral wall of the movable sleeve 70, and each of the two sealing flanges 73 has an annular shape and is formed in the peripheral wall of the movable sleeve 70. The two connecting slots 71 of the movable sleeve 70 are located between the two sealing flanges 73.

In operation, the cold water from the cold water source and the hot water from the hot water source initially flow into the water inlet holes 52 of the two mounting seats 50 respectively. At this time, the rotation plate 20 is rotated by the control unit 10, and the two regulating slots 21 of the rotation plate 20 are movable to align with the through holes 33 of the fixed plate 30. In such a manner, the water from the water inlet hole 52 of each of the two mounting seats 50 in turn flows through a respective one of the two connecting grooves 62 of the fixed sleeve 60, a respective one of the two connecting slots 71 of the movable sleeve 70, the respective water outlet hole 53, a respective one of the two water conduits 431 of the valve seat 43, a respective one of the through holes 33 of the fixed plate 30 and a respective one of the two regulating slots 21 of the rotation plate 20 into the receiving chamber 41 of the valve housing 40. At this time, the cold water and the hot water are mixed in the receiving chamber 41 of the valve housing 40. Then, the mixed water flows through the water outlet channel 44 and is injected from the valve housing 40 and the valve seat 43 for use with a user.

Figure 8:
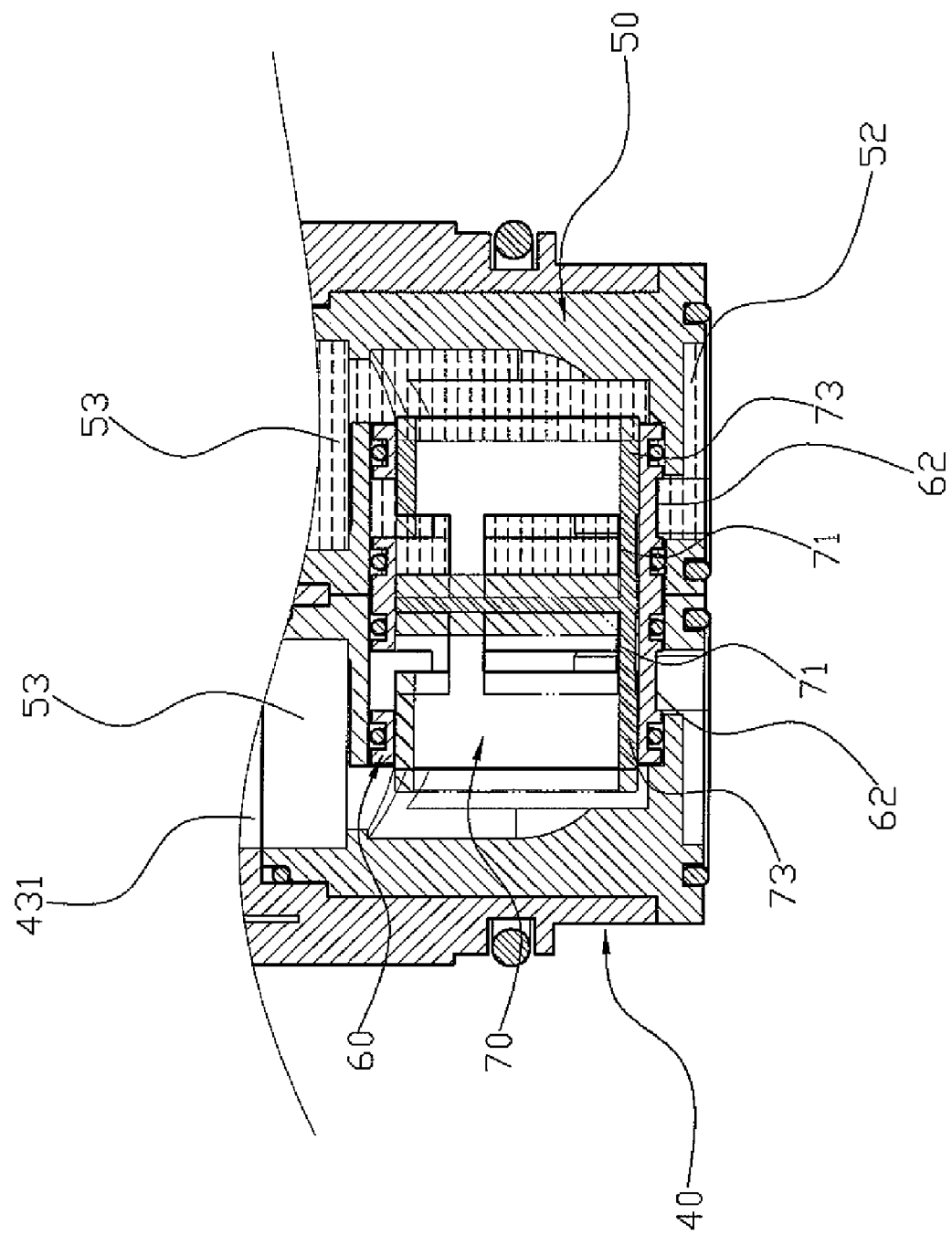
FIG. 8 is a schematic operational view of the control valve as shown in FIG. 4.
Figure 9:
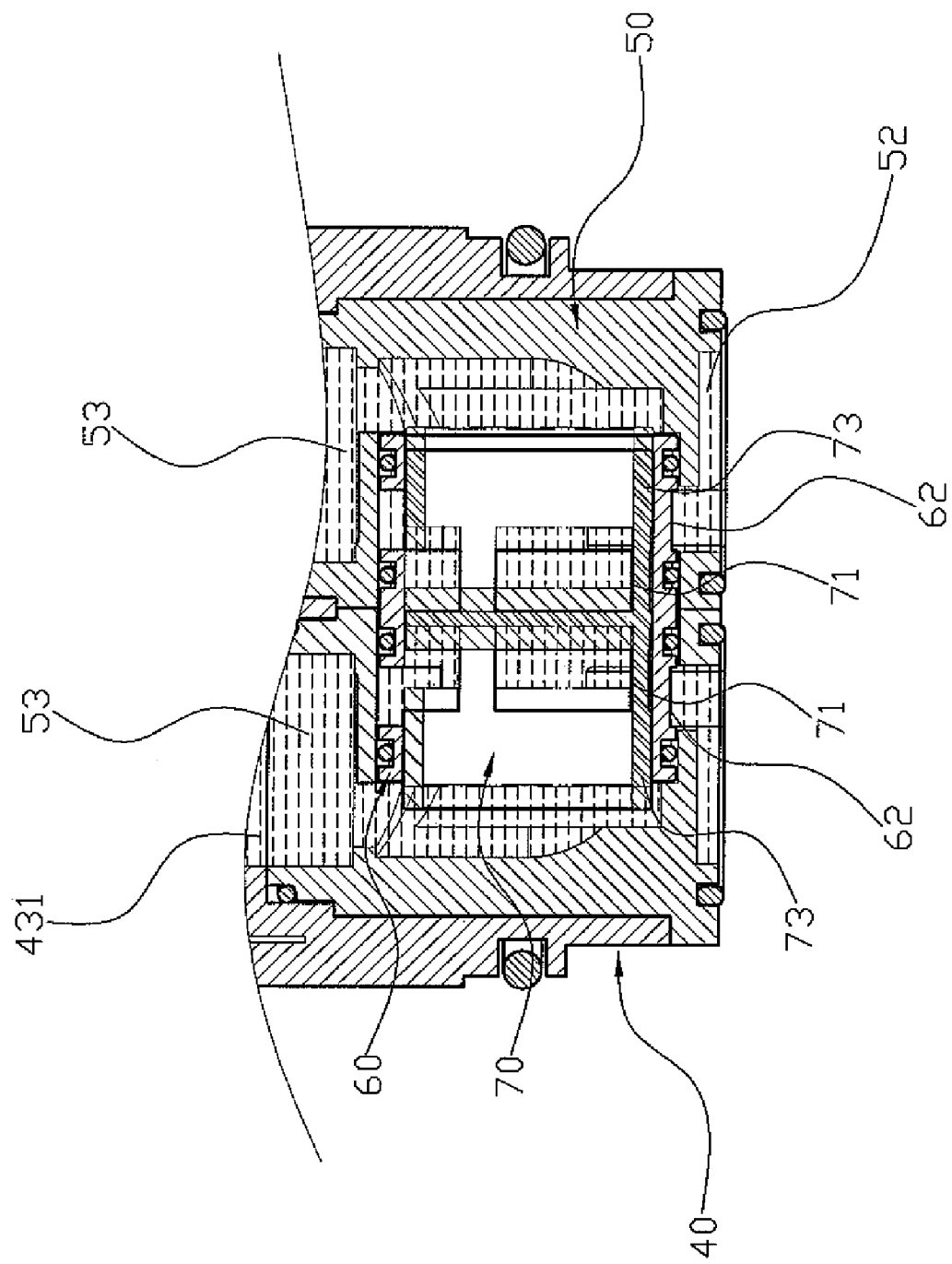
FIG. 9 is a schematic operational view of the control valve as shown in FIG. 8.

On the other hand, referring to FIGS. 8 and 9 with reference to FIGS. 1-7, when the water flow of the water inlet hole 52 of a first one of the two mounting seats 50 is reduced or stops accidentally due to an irregular condition, the water pressure of the water inlet hole 52 of a second one of the two mounting seats 50 will push the movable sleeve 70 toward the first one of the two mounting seats 50, so that the movable sleeve 70 is movable in the fixed sleeve 60 to move one of the two sealing flanges 73 to partially block or entirely interrupt the respective connecting groove 62 of the fixed sleeve 60 as shown in FIG. 8 and to partially block or entirely interrupt the water inlet hole 52 of the second one of the two mounting seats 50 so as to reduce or stop the water flow of the water inlet hole 52 of the second one of the two mounting seats 50.

After the water flow of the water inlet hole 52 of the first one of the two mounting seats 50 is returned to the normal state, the water pressure of the water inlet hole 52 of the first one of the two mounting seats 50 will push the movable sleeve 70 backward toward the second one of the two mounting seats 50, so that the movable sleeve 70 is movable in the fixed sleeve 60 to move the one of the two sealing flanges 73 to detach from the respective connecting groove 62 of the fixed sleeve 60 as shown in FIG. 9 and to return the water flow of the water inlet hole 52 of the second one of the two mounting seats 50 to the normal state.

Accordingly, the movable sleeve 70 is movable in the fixed sleeve 60 to control the water flow rate of the mixed cold and hot water to the optimum value to regulate and stabilize the water pressure automatically so as to provide a pressure balance effect so that the mixed water flowing from the water outlet channel 44 is kept at a constant temperature, thereby providing a comfortable sensation to a user. In addition, the two mounting seats 50, the fixed sleeve 60 and the movable sleeve 70 are fully hidden in the valve housing 40 so that the water faucet directly has a water pressure balance function without having to provide a pressure stabilizer additionally to stabilize the water pressure, thereby greatly decreasing the cost.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:
1. A control valve, comprising:
a valve housing having an inner wall provided with a receiving chamber;
a hollow valve seat mounted in the valve housing and having a top provided with two water conduits each connected to the receiving chamber of the valve housing;
at least one water outlet channel formed between the inner wall of the valve housing and an outer wall of the valve seat and connected to the receiving chamber of the valve housing;
a fixed plate secured in the valve housing and provided with two through holes connected to the two water conduits of the valve seat respectively;
a rotation plate rotatably mounted in the valve housing and provided with two regulating slots that are movable to align with the through holes of the fixed plate to connect the through holes of the fixed plate to the receiving chamber of the valve housing respectively;
a control unit rotatably mounted on the valve housing and secured to the rotation plate to drive and rotate the rotation plate;
two mounting seats mounted in the valve seat and each having a lower end provided with a water inlet hole and an upper end provided with a water outlet hole connected to a respective one of the two water conduits of the valve seat;

a fixed sleeve secured in the two mounting seats and provided with two connecting grooves each connected between the water inlet hole and the water outlet hole of a respective one of the two mounting seats;

a movable sleeve movably mounted in the fixed sleeve and provided with two connecting slots each movable to align with a respective one of the two connecting grooves and two sealing flanges each movable to align with a respective one of the two connecting grooves to partially block or entirely interrupt a connection between the water inlet hole and the water outlet hole of a respective one of the two mounting seats.

2. The control valve in accordance with claim 1, wherein the control unit includes
   a valve cover mounted on the valve housing to cover the rotation plate;
   a driven plate rotatably mounted on the valve cover and secured to the rotation plate to drive and rotate the rotation plate;
   a control shank rotatably mounted on the valve cover and having a lower end extending through the valve cover and secured to the driven plate to rotate the driven plate.

3. The control valve in accordance with claim 2, wherein the valve housing has a top provided with a protrusion;
   the valve cover of the control unit has a periphery provided with an opening secured on the protrusion of the valve housing to secure the valve cover on the valve housing.

4. The control valve in accordance with claim 2, wherein the control unit further includes a micro-adjustment device mounted on the valve cover and co-operating with the control shank.

5. The control valve in accordance with claim 2, wherein the rotation plate has a surface provided with a plurality of locking holes;
   the driven plate of the control unit is provided with a plurality of locking legs inserted into the locking holes of the rotation plate so that the rotation plate is rotated by the driven plate.

6. The control valve in accordance with claim 1, wherein the inner wall of the valve housing is provided with a plurality of fixing rails;
   the fixed plate has a peripheral wall provided with a plurality of fixing grooves mounted on the fixing rails of the valve housing to secure the fixed plate in the valve housing.

7. The control valve in accordance with claim 1, wherein the valve seat has an oblong shape.

8. The control valve in accordance with claim 1, wherein the valve seat partially protrudes outwardly from the receiving chamber of the valve housing.

9. The control valve in accordance with claim 1, wherein the rotation plate abuts a top of the fixed plate.

10. The control valve in accordance with claim 1, wherein each of the two regulating slots of the rotation plate has a horn shape and has a size increased gradually from one end to the other end of each of the two regulating slots.

11. The control valve in accordance with claim 1, wherein the two regulating slots of the rotation plate are directed two different directions.

12. The control valve in accordance with claim 1, wherein the fixed plate abuts the top of the valve seat to isolate the two water conduits of the valve seat from the receiving chamber of the valve housing.

13. The control valve in accordance with claim 1, wherein the fixed plate has two opposite flattened sides aligning with the water outlet channel between the valve housing and the valve seat.

14. The control valve in accordance with claim 1, wherein the two mounting seats are juxtaposed to each other.

15. The control valve in accordance with claim 1, wherein
   each of the two mounting seats has a side provided with a mounting chamber connected between the water inlet hole and the water outlet hole;
   the mounting chambers of the two mounting seats are connected to each other;
   the fixed sleeve is secured in the mounting chambers of the two mounting seats.

16. The control valve in accordance with claim 1, wherein each of the two mounting seats has a periphery provided with a plurality of locking tenons and a plurality of locking bores so that the two mounting seats are combined together by the locking tenons and the locking bores.

17. The control valve in accordance with claim 1, wherein each of the water inlet hole and the water outlet hole of each of the two mounting seats has an outer wall provided with an O-ring to provide a sealing effect.

18. The control valve in accordance with claim 1, wherein the fixed sleeve has an inside provided with a receiving hole connected to the two connecting grooves to receive the movable sleeve.

19. The control valve in accordance with claim 1, wherein
   each of the two connecting grooves has an annular shape and is formed in a peripheral wall of the fixed sleeve;
   each of the two connecting slots has an annular shape and is formed in a peripheral wall of the movable sleeve;
   each of the two sealing flanges has an annular shape and is formed in the peripheral wall of the movable sleeve.

20. The control valve in accordance with claim 1, wherein the two connecting slots of the movable sleeve are located between the two sealing flanges.

* * * * *